United States Patent [19]

Fender et al.

[11] Patent Number: 4,561,592

[45] Date of Patent: Dec. 31, 1985

[54] ROBOT SPRAY HEAD

[75] Inventors: Norman N. Fender, Monroe, Mich.; Mark S. Davis, Schaumburg, Ill.

[73] Assignee: Graco Robotics, Inc., Livonia, Mich.

[21] Appl. No.: 592,080

[22] Filed: Mar. 22, 1984

[51] Int. Cl.4 .............................................. B05B 15/08
[52] U.S. Cl. ........................................ 239/587; 74/109
[58] Field of Search ......................... 239/587; 901/43; 215/190; 74/109, 32, 33

[56] References Cited

U.S. PATENT DOCUMENTS

| | | | |
|---|---|---|---|
| 1,818,313 | 8/1931 | Everts | 74/32 |
| 3,153,286 | 10/1964 | Buisson | 74/109 |
| 3,349,927 | 10/1967 | Blatt | 74/110 |
| 3,561,398 | 2/1971 | Rose et al. | 239/69 |
| 3,931,930 | 1/1976 | Waldrum | 239/587 |
| 4,205,791 | 6/1980 | Dooley | 901/43 |
| 4,449,738 | 5/1984 | Hotger | 285/190 |

Primary Examiner—Andres Kashnikow
Assistant Examiner—Scott D. Malpede
Attorney, Agent, or Firm—Paul L. Sjoquist

[57] ABSTRACT

Apparatus for attachment to an automated robot or other similar type of automatic machinery, for controlling paint spraying nozzles to provide additional degrees of freedom of spray direction and film coating, including a rack and pinion gearing housing attachable to the robot, one or more air cylinders mechanically linked to the rack and pinion gearing, a shaft rotatably coupled to the pinion gear and fixedly attached to one or more spray nozzles. Air activation of the air cylinders causes the pinion gearing mechanism to pivotally rotate about the shaft axis, rotatably positioning the spray nozzles in various preselected angular positions.

13 Claims, 7 Drawing Figures

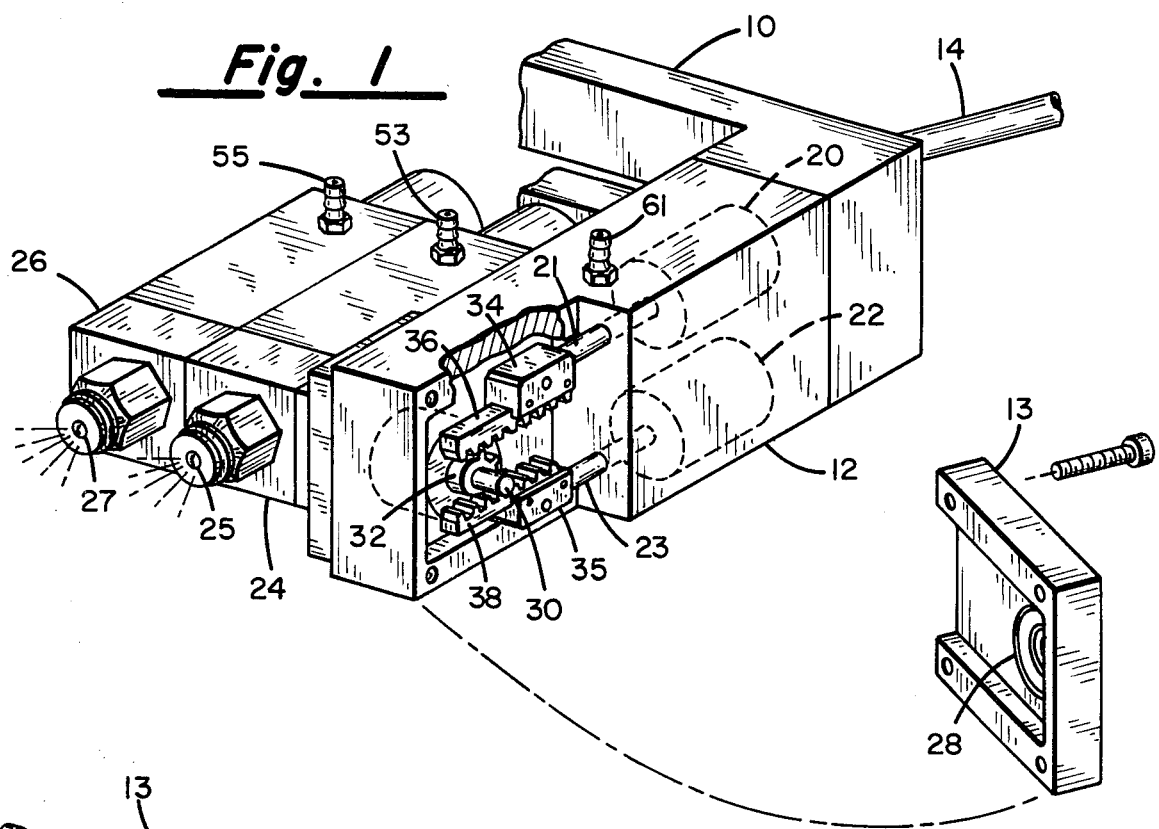
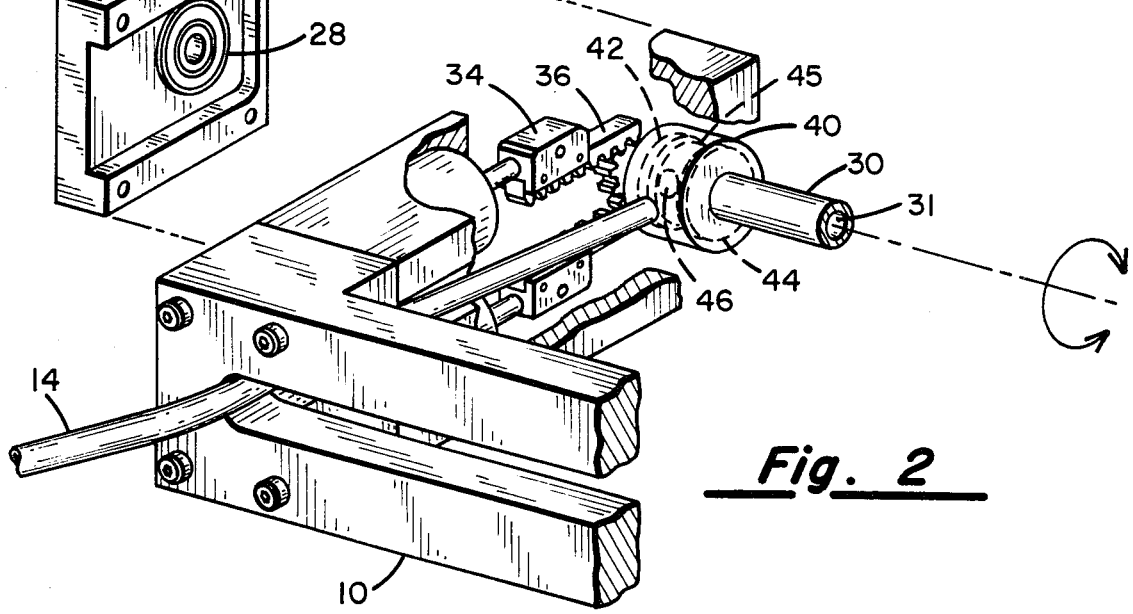

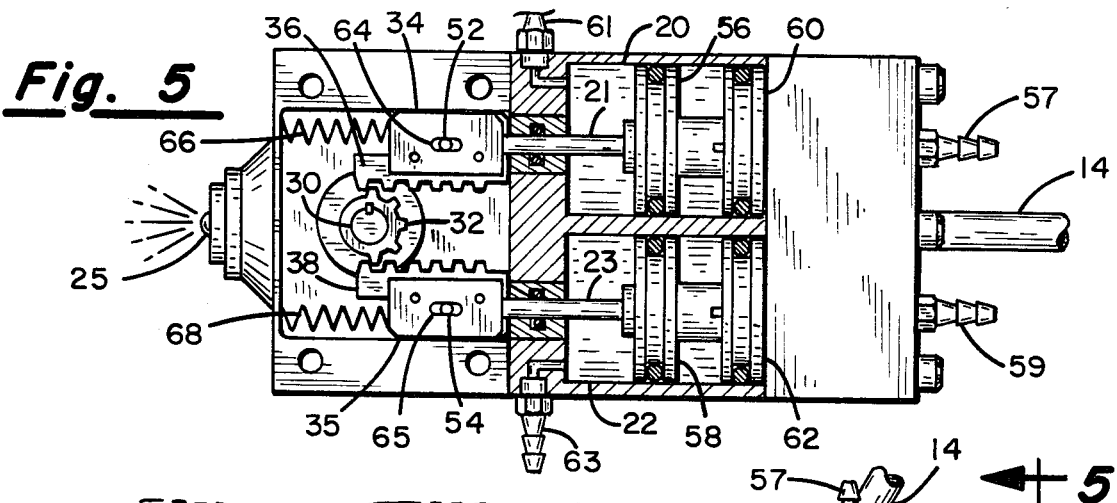
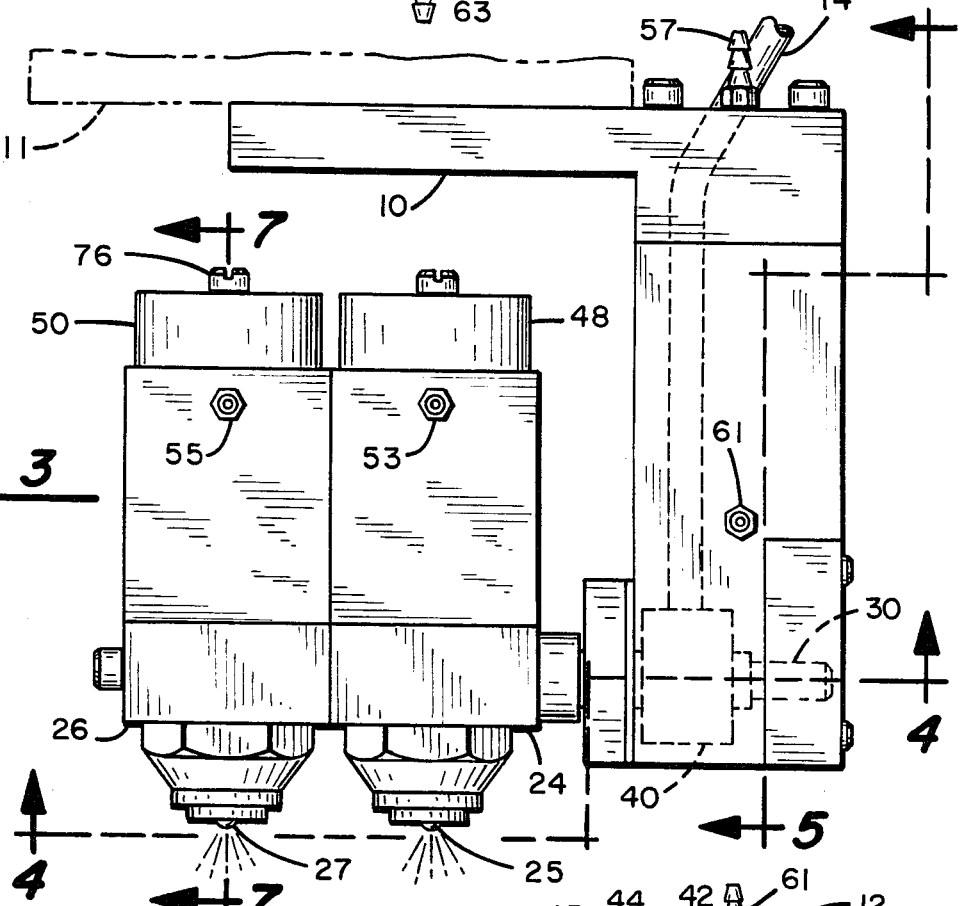
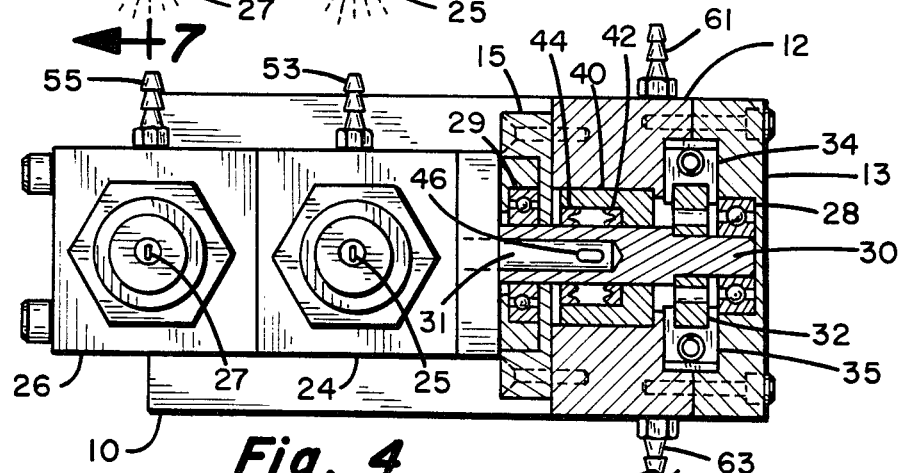

ROBOT SPRAY HEAD

BACKGROUND OF THE INVENTION

The present invention relates to paint spraying devices, and more particularly to automatic paint spraying equipment wherein a spray head is connected to the end of a movable robot arm, and the robot arm is controllable by means of a data processing computer or other programmable controller.

Paint spraying robots have been used in industry for a number of years, wherein a paint spray nozzle is attachable to the forward end of a robot arm, and the robot arm is controllable under automatic program control to direct the paint spray nozzle toward a workpiece. Improvements in such devices in recent years have enabled such robot-controlled spray nozzles to be manipulable to paint complex shapes, and to paint workpieces which move past the robot station on a conveyer line. For example, automobile and truck bodies have been painted by automated robot equipment, wherein such bodies are continuously moving along a conveyer line, and a robot station includes a sensor for detecting the presence of a particular shape body, and a robot control system enables the spraying of paint over the body contours even while the body continues its movement along the conveyer line.

Certain structures such as automobile and truck bodies do present difficult painting problems, however, even for automated robot equipment. For example, it is difficult for a robot to paint the inside surface of a body, which is usually totally enclosed except for door and window openings. Such painting necessitates the extension of the robot arm into the body while the conveyer is moving the body along, and the robot is required to quickly maneuver the spray nozzle to all possible painting positions inside the body while compensating for the movement of the conveyer line. In some cases this requires the robot to paint nearly directly backward towards itself, and present state-of-the-art in robot wrist and arm mechanisms have made it difficult to construct an arm having freedom of movement to cover all possible spraying directions.

Since the paint spray nozzle is generally fixed relative to the robot arm to which it is connected, limitations in the flexibility of the robot arm usually result in limitations with respect to the flexibility of freedom of movement of the spray nozzle. Further, since only a single spray nozzle is typically affixed to a robot arm, the amount of paint dispensed from the nozzle is usually predetermined and fixed by selection of the nozzle orifice opening. It has not been possible to apply paint through a spray nozzle to achieve a first paint thickness on one area of coating, and to achieve a second paint thickness on another area of coating, without making repeated passes at a particular area with a spray nozzle. In cases where the spraying operation is made on an article moving on a conveyer line, it is frequently not possible to make multiple passes over predetermined areas of the workpiece during the limited time in which the workpiece passes through the paint spray workstation. In such cases, multiple spray guns and additional spray booths have been necessary, to give the desired degree of paint thickness on areas of the workpiece where thickness variations are required. It is therefore desirable to provide a spray nozzle mechanism wherein automated robot control may be enhanced by the additional option of selecting spray nozzles for applying different amounts of paint to predetermined sections of the workpiece.

SUMMARY OF THE INVENTION

The present invention is adapted for connection to a robot arm or other type of automatic spray painting machinery. The invention includes a gear housing which is fixedly attached to the movable robot mechanism, and which encloses one or more rack and pinion gears and air cylinders for moving said gears relative to one another. A pinion gear within the housing is attached to a rotatable shaft projecting from the housing, and one or more spray nozzles are affixed to the shaft. Activation of an air cylinder causes a rack gear to move across the pinion gear, thereby rotating the shaft and the nozzles connected thereto for pivotable motion about the axis of the shaft.

It is therefore a principal object of the present invention to provide a spray nozzle for connection to a robot or other automated mechanism, which spray nozzle has controllable degrees of freedom about an axis normal to the robot arm axis.

It is a further object of the present invention to provide a robot spray nozzle having controllable and preselected pivotal positions while mounted to an automated paint spray robot mechanism.

It is yet another object of the present invention to provide multiple paint spray nozzles for attachment to a robot paint spraying mechanism, wherein each such multiple spray nozzle provides different spray application rates.

It is another object of the present invention to provide a paint spray nozzle for attachment to a robot mechanism which is pivotable about an axis normal to the robot arm and over a range of up to 180°. These and other objects and advantages of the invention will become apparent from the following specification and with reference to the appended drawings.

BRIEF DESCRIPTION OF THE DRAWINGS

FIG. 1 shows an isometric view of the preferred embodiment of the invention; and FIG. 2 shows an isometric rear view of a portion of the invention; and FIG. 3 shows a top view of the invention; and FIG. 4 shows a view taken along the lines 4—4 of FIG. 3; and FIG. 5 shows a view taken along the lines 5—5 of FIG. 3.

DESCRIPTION OF THE PREFERRED EMBODIMENT

Figure 6:
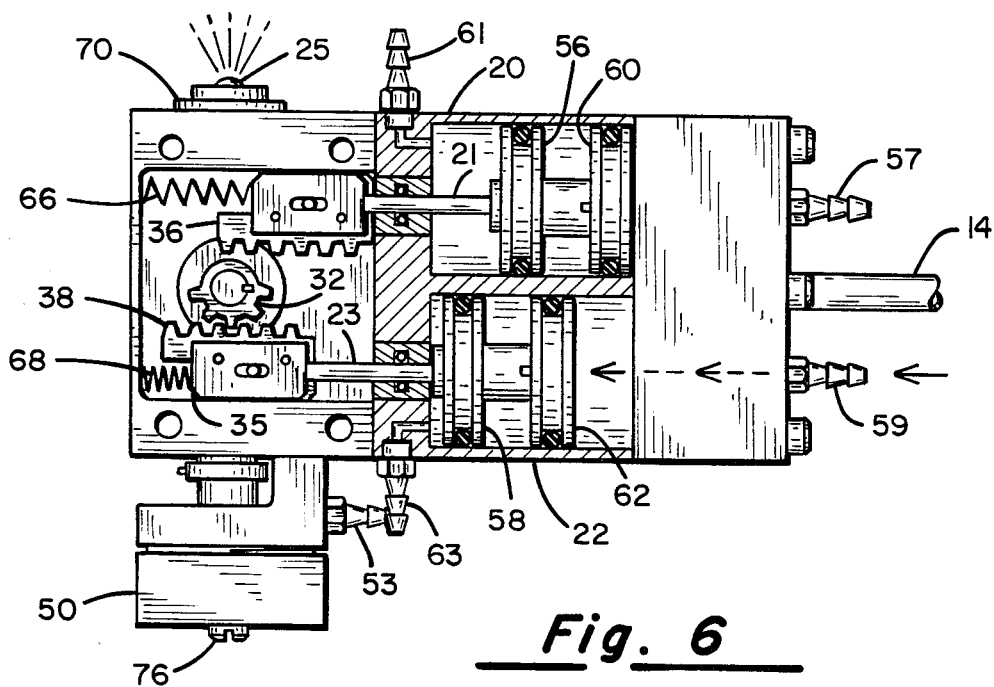
FIG. 6 shows a further position of the invention shown in FIG. 5.

Referring first to FIG. 1 there is shown the invention in isometric view, in partial cutaway. A bracket 10 is adapted for attachment to a robot mechanism or other similar automation equipment. Bracket 10 is attached to a housing 12 which contains some of the components to be hereinafter described. A cover 13 is removably attached to housing 12. Cover 13 has attached thereto a bearing 28 which is sized for fitting over shaft 30. A shaft 30 projects into housing 12, and has a pinion gear 32 attached thereon. Pinion gear 32 has a plurality of gear teeth extending about less than one-half its circumference. Shaft 30 is coupled to one or more spray nozzles 24, 26, so as to cause rotational motion of the spray nozzles whenever shaft 30 is rotated. Spray nozzle 24 has a spray tip 25, and spray nozzle 26 has a spray tip 27. Spray tips 25 and 27 are preferably designed for different paint spray characteristics. For example, spray tip 25 may have a predetermined first orifice sized for spraying paint at a predetermined first volume rate, and spray tip 27 may have a second and larger spray orifice sized for spraying greater paint volumes. Alternatively, spray tips 25 and 27 may be preselected to provide varying degrees of spray pattern width, so that, for example, one of the spray tips can distribute paint over a relatively narrow spraying pattern and the other spray tip can distribute paint over a fairly wide pattern.

Housing 12 encloses an air cylinder 20 and a second air cylinder 22. Air cylinder 20 has an internal piston which is attached to rod 21, and air cylinder 22 has an internal piston which is attached to rod 23. In all respects, air cylinders 20 and 22 are connected to identical mechanical components, which will be described with reference to air cylinder 20. Rod 21 is attached to a link 34 which projects forwardly beyond the end of rod 21. Link 34 is attached to a rack gear 36 having a plurality of aligned gear teeth. The gear teeth of rack gear 36 are adapted for meshing against similar gear teeth on pinion gear 32. Similarly, rod 23 connects to link 35 and rack gear 38, which has a plurality of gear teeth for meshing with the gear teeth of pinion gear 32.

FIG. 2 shows a rear isometric view in partial cutaway. A paint delivery line 14 is adapted for coupling to a source of hydraulically pressurized paint. Paint line 14 is sealably connected to a fluid coupler 40. Fluid coupler 40 has therein a pair of fluid seals 42, 44 which provide a tight fluid seal about shaft 30 and create an inner fluid chamber 45 inside of fluid coupler 40. Shaft 30 is hollow, having an internal bore 31 adapted for the passage of fluid flow therethrough. An opening 46 is drilled through the side of shaft 30 in the region of chamber 45 so as to provide a fluid passage from fluid chamber 45 into bore 31. Opening 46 through shaft 30 provides a path for fluid flow from paint line 14 to bore 31 regardless of the rotational position of shaft 30.

FIG. 3 shows a top view of the apparatus, wherein bracket 10 is preferably attached to a robot arm 11 or other similar automated moving mechanism. Spray nozzles 24 and 26 are attached in side-by-side arrangement on shaft 30. Spray nozzles 24 and 26 are constructed according to well-known manufacturing techniques in the field of manufacturing paint spray nozzles, and openings through shaft 30 are provided for the flow of fluid into each of these spray nozzles. Spray nozzle 24 has an internal valve which may be actuated by an air cylinder 48. Similarly, spray nozzle 26 has an internal valve which may be actuated by an air cylinder 50. Air cylinders 48 and 50 respectively are actuated to open their respective spray valves by applying pressurized air through air inlets 53, 55. Fluid coupler 40, fluid line 14 and shaft 30 are shown in dotted outline in FIG. 3 in order to properly reference cross-section line 4—4.

FIG. 4 shows a view taken along the lines 4—4 of FIG. 3. One end of shaft 30 is seated in bearing 28, which bearing is held within cover 13. A second bearing 29 is held within cover 15, and bearing 29 also supports shaft 30. Shaft 30 has a first end portion of reduced diameter, which is sized to seat within bearing 28, and which has pinion gear 32 rigidly affixed thereto. The remainder of shaft 30 is of larger diameter, and has an internal bore 31. Bore 31 serves as a fluid passage between fluid coupler 40 and spray nozzles 24 and 26. The fluid within bore 31 is pressurized to a level sufficient to create a spray when the fluid is permitted to exist from either spray tip 25 or spray tip 27. Either of these spray tips may be used to spray fluid, depending upon whether air cylinder 48 is actuated or air cylinder 50 is actuated as described above.

Shaft 30 is rotatable about its axis by means of pinion gear 32. The operation of this aspect of the invention may best be seen with reference to FIG. 5 and FIG. 6, which show the invention in side elevation view and in partial cross section. Pinion gear 32 is rotatable in a counterclockwise direction by forward motion of rack gear 36. Rack gear 36 is attached to link 34, and link 34 is also attached to rod 21. Rod 21 is connected to a piston 56 inside air cylinder 20. Piston 56 is connected to a second piston 60, which act together to form a reciprocable piston member inside air cylinder 20. An air inlet 57 communicates with the inside of cylinder 20, and a second air inlet 61 also communicates with the inside of cylinder 20. The application of pressurized air at inlet 57, together with the simultaneous valving of air inlet 61 to atmospheric pressure, causes pistons 56 and 60 to move leftward in cylinder 20. This causes rack gear 36 to move leftward by a similar amount and thereby causes counterclockwise rotation of pinion gear 32.

Links 34 and 35 are each respectively urged toward a rightward rest position by means of springs 66 and 68 respectively. When links 34 and 35 are in their respective rightward rest positions, the rack gears 36 and 38 are each similarly positioned at a rightward position, and in noninterfering engagement with the gear teeth on pinion gear 32. The rest position of rack gear 38 therefore permits counterclockwise motion of pinion gear 32 without interference. Similarly, the rightward position of rack gear 36 permits clockwise rotation of pinion gear 32 without interference. Link 34 is coupled to rod 21 by means of a pin 52 which is slidable within a slot 64 in link 34. Similarly, link 35 is connected to rod 23 by means of a pin 54 affixed to rod 23 which is slidable within a slot 65 in link 35. When links 34 and 35 are in their respective rightward rest positions, pins 52 and 54 are respectively positioned against the forward end of slot 64 and 65. Therefore, if pistons 58 and 62 are actuated by application of pressurized air at inlet 59, assuming inlet 63 is relieved to atmospheric pressure, the resultant leftward motion of pistons 58 and 62 causes link 35 and rack gear 38 to immediately move leftward. This causes pinion gear 32 to rotate in a clockwise direction without interference with rack gear 36. Similarly, actuation of pistons 56 and 60 causes leftward movement of link 34 and rack gear 36, and consequent counterclockwise motion of pinion gear 32 without interference with rack gear 38.

Air cylinder 20 is actuable to cause leftward movement of rack gear 36 by a predetermined distance, which corresponds approximately to 90° of rotational counterclockwise motion of shaft 30. Air cylinder 22 is actuable to cause leftward movement of rack gear 38 and clockwise motion of shaft 30 by approximately 90°. Since spray valves 24 and 26 are affixed to shaft 30 the spray valves will rotate with shaft 30 in correspondence.

Figure 7:
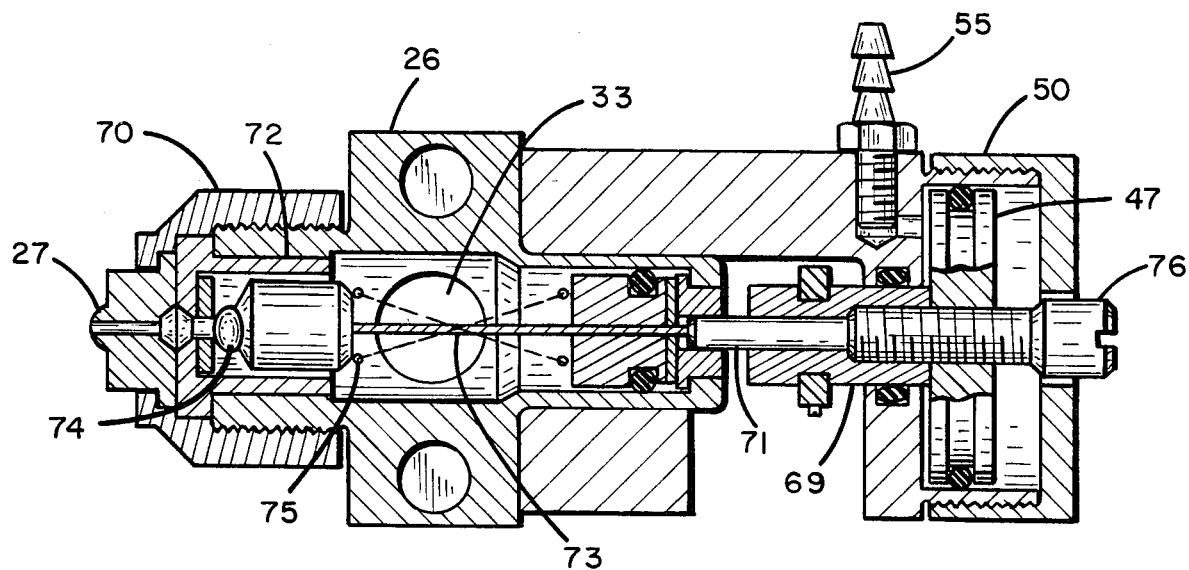
FIG. 7 shows a view taken along the lines 7—7 of FIG. 3.

FIG. 7 shows a view taken along the lines 7—7 of FIG. 3, which is a cross-sectional view of spray valve 26. It is to be presumed that the cross-sectional view of spray valve 24 is identical, and therefore only one valve need be described. Spray valve 26 includes a spray tip 27 which is securely held against the valve body by threadable locknut 70. Locknut 70 clamps spray tip 27 and a resilient seal member 72 in liquid sealing relationship against the spray valve body. A ball valve 74 is seated against the rear opening through spray tip 27, and is held in a seated position by compression spring 75. A valve rod or wire is secured at one of its ends to valve 74, and is secured at the other of its ends to a guide 71. Guide 71 is attached to a threadable screw 76, which is threadably secured to a block 69. Threadable adjustment of screw 76 adjusts the relative tension on valve rod 73, and thereby adjusts the relative seating force of ball valve 74 against its seat.

A bore 33 passes all the way through spray nozzle 26, and is in flow communication with bore 31 of shaft 30. Air cylinder 50 has therein a piston 47 which is rearwardly movable upon application of pressurized air at air inlet 55. Piston 47 moves against the force of spring 75, and when the pressurized air at inlet 55 is removed the action of spring 75 causes valve 74 to close.

In operation, if it is desired to accomplish spraying in a forward direction as is shown in the drawings, the air pressures within air cylinders 20 and 22 are maintained in equilibrium. Therefore, there is no unbalanced air pressure within either cylinder to cause movement of the respective pistons, and no motion of either rack gear. In this event, spray valve 24 may be actuated upon activation of air cylinder 48 to cause spraying from spray tip 25; alternatively, spray nozzle 26 may be actuated by air cylinder 50 to cause spraying from spray tip 27.

Spray nozzles 24 and 26 may be directed approximately 90° downwardly by application of pressurized air at air inlet 57, which causes the pistons within air cylinder 20 to move forwardly, and moves rack gear 36 to the left. This causes counterclockwise rotation of pinion gear 32 on shaft 30, and rotation of spray nozzles 24 and 26 to a downward position. Thereafter, either air cylinder 48 or 50 may be actuated to cause actual spraying from either spray tip 25 or 27.

In the event spraying is desired in an upward direction, pressurized air is applied to air inlet 59, which causes the pistons within air cylinder 22 to move forwardly, thereby causing rack gear 38 to move leftward and causes clockwise rotation of pinion 32 and shaft 30. In each case, when one of the air cylinders 20 or 22 is actuated it is presumed that the air inlets to the other air cylinder are relieved to atmospheric pressure, and in no event will both air cylinders 20 and 22 be actuated at the same time.

An alternative embodiment of the invention could be constructed wherein the air cylinder members described herein are replaced by linearly actuable solenoid mechanisms, or other equivalent devices capable of providing the necessary linear motion to the rack gears contained in housing 12. Likewise, the air cylinders connected to actuate the respective spray valves could be replaced by equivalent linear actuating mechanisms. Air cylinders have been found to be preferable for use in connection with devices for the spraying of paints and other volatile substances, for it is desirable to avoid the use of electrical components in the presence of volatile materials.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A rotatable spray valve assembly adapted for attachment to a mechanical robot or the like, comprising
   (a) a housing adapted for attachment to said robot;
   (b) a pair of linearly actuable members in said housing arranged in approximate parallel alignment, each of said actuable members having an actuating rod extending therefrom;
   (c) a rack gear attached to each of said actuating rods;
   (d) a pinion gear and shaft positioned intermediate said rack gears, said pinion gear engageable by either of said rack gears to cause rotation of said shaft;
   (e) at least one spray nozzle attched to said shaft for rotation therewith; and
   (f) an axial bore extending at least partially through said shaft, said bore being in fluid flow communication with said spray nozzles, and said shaft having a further opening therethrough to said bore, said opening being in fluid flow communication with a source of pressurized fluid.

2. The apparatus of claim 1, further comprising a chamber surrounding said shaft at said further shaft opening, said chamber having means for fluid seating about said shaft to permit relative rotation of said shaft within said fluid chamber, and said fluid chamber having connection means for coupling to a source of pressurized fluid.

3. The apparatus of claim 2, further comprising two spray nozzles attached to said shaft in side-by-side arrangement.

4. The apparatus of claim 3, wherein said pinion gear further comprises a gear having circumferential teeth, said teeth extending only partially about the circumference of said gear.

5. The apparatus of claim 4, further comprising a link interconnecting each of said rack gears to a respective actuating rod, said link having a slot therein and said actuating rod having a pin attached thereto and engaged in said slot.

6. The apparatus of claim 5, further comprising a spring coupled to each of said links, said spring acting in a direction to urge said link toward said linearly actuable member.

7. The apparatus of claim 6, wherein said linearly actuable members each further comprise an air cylinder having a reciprocable piston therein.

8. The apparatus of claim 1, wherein said linearly actuable members each further comprise an air cylinder having a reciprocable piston therein.

9. The apparatus of claim 8, further comprising a link interconnecting each of said rack gears to a respective actuating rod, said link having a slot therein and said actuating rod having a pin attached thereto and engaged in said slot.

10. The apparatus of claim 9, further comprising a spring coupled to each of said links, said spring acting in a direction to urge said link toward said linearly actuable member.

11. The apparatus of claim 10, further comprising two spray nozzles attached to said shaft in side-by-side arrangement.

12. The apparatus of claim 11, further comprising a chamber surrounding said shaft at said further shaft opening, said chamber having means for fluid seating about said shaft to permit relative rotation of said shaft within said fluid chamber, and said fluid chamber having connection means for coupling to a source of pressurized fluid.

13. The apparatus of claim 12, wherein said pinion gear further comprises a gear having circumferential teeth, said teeth extending only partially about the circumference of said gear.

* * * * *